United States Patent
Weber

(10) Patent No.: US 11,453,000 B2
(45) Date of Patent: Sep. 27, 2022

(54) METHOD FOR CONNECTING COMPONENTS OF A MICROFLUIDIC FLOW CELL

(71) Applicant: thinXXS Microtechnology AG, Zweibrücken (DE)

(72) Inventor: Lutz Weber, Zweibrücken (DE)

(73) Assignee: THINXXS MICROTECHNOLOGY AG, Zweibrücken (DE)

( * ) Notice: Subject to any disclaimer, the term of this patent is extended or adjusted under 35 U.S.C. 154(b) by 0 days.

(21) Appl. No.: 16/421,772

(22) Filed: May 24, 2019

(65) Prior Publication Data

US 2019/0275517 A1 Sep. 12, 2019

Related U.S. Application Data

(62) Division of application No. 14/652,316, filed on Jun. 15, 2015, now Pat. No. 10,343,158.

(30) Foreign Application Priority Data

Dec. 14, 2012 (DE) ...................... 10 2012 112 306.3

(51) Int. Cl.
*B01L 3/00* (2006.01)
*B29C 65/00* (2006.01)
(Continued)

(52) U.S. Cl.
CPC .... *B01L 3/502707* (2013.01); *B29C 65/4895* (2013.01); *B29C 65/54* (2013.01); *B29C 66/1222* (2013.01); *B29C 66/1224* (2013.01); *B29C 66/47* (2013.01); *B29C 66/5346* (2013.01); *B29C 66/61* (2013.01);
(Continued)

(58) Field of Classification Search
CPC ..... B29C 66/71; B29C 65/4895; B29C 65/54; B29C 66/1222; B29C 66/1224; B29C 66/47; B29C 66/5346; B29C 66/61; B29C 66/73771; B29C 66/7392; B29K 2023/38; B29K 2025/06; B29K 2033/12; B29K 2069/00; B01L 2200/027; B01L 2200/0689; B01L 2200/12; B01L 2300/0636; B01L 2300/0645; B01L 2300/0816;
(Continued)

(56) References Cited

U.S. PATENT DOCUMENTS

| | | | |
|---|---|---|---|
| 5,222,850 A | * | 6/1993 | Medal .................... B29C 65/08 285/21.2 |
| 7,001,572 B1 | | 2/2006 | Gueritault et al. |
| 2007/0141805 A1 | | 6/2007 | Chang et al. |

FOREIGN PATENT DOCUMENTS

| | | |
|---|---|---|
| DE | 19922075 A1 | 11/2000 |
| EP | 0711650 A1 | 5/1996 |

(Continued)

*Primary Examiner* — Samuel P Siefke
(74) *Attorney, Agent, or Firm* — Lucas & Mercanti, LLP; Klaus P. Stoffel

(57) ABSTRACT

A flow cell and a method for connecting components of a microfluidic flow cell, in particular for integrating component parts into a carrier structure of the flow cell, in which a gap is formed between the components to be connected. The gap is filled with a solvent. The material of at least one component bordering the gap dissolves in the solvent and the material completely fills the width of the gap and partially fills the height thereof after evaporation of the solvent.

10 Claims, 3 Drawing Sheets

(51) Int. Cl.
*B29C 65/48* (2006.01)
*B29C 65/54* (2006.01)
*B29L 31/00* (2006.01)
*B29L 22/00* (2006.01)

(52) U.S. Cl.
CPC ... *B29C 66/73771* (2013.01); *B01L 2200/027* (2013.01); *B01L 2200/0689* (2013.01); *B01L 2200/12* (2013.01); *B01L 2300/0636* (2013.01); *B01L 2300/0645* (2013.01); *B01L 2300/0816* (2013.01); *B01L 2300/0877* (2013.01); *B01L 2300/12* (2013.01); *B29C 66/71* (2013.01); *B29C 66/7392* (2013.01); *B29L 2022/00* (2013.01); *B29L 2031/756* (2013.01)

(58) Field of Classification Search
CPC ......... B01L 2300/0877; B01L 2300/12; B01L 3/502707; B29L 2022/00; B29L 2031/756
See application file for complete search history.

(56) References Cited

FOREIGN PATENT DOCUMENTS

| | | |
|---|---|---|
| EP | 2336785 A1 | 6/2011 |
| WO | 2012004296 A1 | 1/2012 |

\* cited by examiner

METHOD FOR CONNECTING COMPONENTS OF A MICROFLUIDIC FLOW CELL

CROSS-REFERENCE TO RELATED APPLICATIONS

The present application is a Divisional Application of U.S. patent application Ser. No. 14/652,316, filed Jun. 15, 2015, which is a 371 of International Application PCT/DE2013/100408 filed on Dec. 5, 2013 which claims the benefit of priority from German Patent Application No. 10 2012 112 306.3 filed Dec. 14, 2012, the contents of each of which are incorporated herein by reference.

BACKGROUND OF THE INVENTION

The invention pertains to a method for connecting components of a microfluidic flow cell, especially for integrating microcomponents into a carrier structure of the flow cell. The invention also pertains to a flow cell produced by the method.

The primary area of application for the method under consideration is the production of flow cells such as those used, for example, in medical analysis and diagnostics, in biochemistry, and in molecular biology as well as in drug development; these flow cells comprise a carrier structure of plastic, into which functional components, especially sensors of silicon, glass, or metal, are integrated. Flow cells of this type are undergoing a process of progressive miniaturization and increasing functional complexity, with the result that such flow cells are now being called "labs on a chip".

In the production of these miniaturized flow cells, functional structures with dimensions ranging from a few 10 µm to a few 100 µm must be produced. In these functional structures, surface properties play a dominant role with respect to, for example, the capillary filling of channels and sample chambers. In addition, assembly techniques are required which make it possible to seal off microchambers and channels in a liquid-tight and pressure-proof manner and especially to form closed microfluidic networks. It takes a great deal of effort to produce such flow cells at low cost in large numbers so that they can be used in the field of medical diagnostics, for example.

Methods borrowed from semiconductor technology are used in the production of these flow cells, especially for the microstructuring of glass or silicon substrates. Especially in the production of complex flow cells, the cost of materials can be very high. A second production technique which is used is based on replication methods, e.g., injection-molding or stamping. It is possible by this means to produce substrates of plastic such as PMMA, PC, PP, or COC at low cost, the surfaces of which can then be modified and/or functionalized by plasma coating or wet-chemical methods. Adhesive methods can be used to mount substrates of this kind, but laser welding methods are also possible. The aspect ratios realizable by this latter method, however are much lower than in the methods of semiconductor technology, which is a disadvantage.

It is known from WO 2012/004296 A1 that microcomponents of glass or silicon can be integrated into carrier structures of plastic by means of an adhesive material which can be cured by UV radiation, for example. The disadvantage here is that there is now a third material present, i.e., not only the plastic material of the carrier structure and the material of the microcomponent integrated into it but also the adhesive material, which can then come into direct contact with the fluids to be tested. This can result in faulty measurements. Nor is it possible to exclude the possibility of toxic effects on the biological sample material. Another disadvantage is that such adhesive materials have a comparatively high viscosity and low wettability, which leads to the result that an adhesive of this type will not fill up an assembly gap by itself; that is, there will be no capillary action. Considerable effort is therefore required to transport the adhesive into such an assembly gap. The curing of adhesive materials filling assembly gaps by means of UV radiation, for example, is time-consuming, and the fabrication results are often unreliable. The low wettability requires wide gaps, and this in turn impairs the accuracy with which the microcomponents can be positioned in the carrier structure. The UV radiation used for curing can have disadvantageous effects on functionalized microcomponents, and in particular it can destroy antibodies immobilized on the functionalized surface of a microcomponent. The same is true for the use of heat to cure adhesives.

SUMMARY OF THE INVENTION

The invention pertains to a method for connecting components of a microfluidic flow cell, especially for integrating microcomponents into a carrier structure of the flow cell. The invention also pertains to a flow cell produced by the method.

The primary area of application for the method under consideration is the production of flow cells such as those used, for example, in medical analysis and diagnostics, in biochemistry, and in molecular biology as well as in drug development; these flow cells comprise a carrier structure of plastic, into which functional components, especially sensors of silicon, glass, or metal, are integrated. Flow cells of this type are undergoing a process of progressive miniaturization and increasing functional complexity, with the result that such flow cells are now being called "labs on a chip".

In the production of these miniaturized flow cells, functional structures with dimensions ranging from a few 10 µm to a few 100 µm must be produced. In these functional structures, surface properties play a dominant role with respect to, for example, the capillary filling of channels and sample chambers. In addition, assembly techniques are required which make it possible to seal off microchambers and channels in a liquid-tight and pressure-proof manner and especially to form closed microfluidic networks. It takes a great deal of effort to produce such flow cells at low cost in large numbers so that they can be used in the field of medical diagnostics, for example.

Methods borrowed from semiconductor technology are used in the production of these flow cells, especially for the microstructuring of glass or silicon substrates. Especially in the production of complex flow cells, the cost of materials can be very high. A second production technique which is used is based on replication methods, e.g., injection-molding or stamping. It is possible by this means to produce substrates of plastic such as PMMA, PC, PP, or COC at low cost, the surfaces of which can then be modified and/or functionalized by plasma coating or wet-chemical methods. Adhesive methods can be used to mount substrates of this kind, but laser welding methods are also possible. The aspect ratios realizable by this latter method, however are much lower than in the methods of semiconductor technology, which is a disadvantage.

It is known from WO 2012/004296 A1 that microcomponents of glass or silicon can be integrated into carrier structures of plastic by means of an adhesive material which can be cured by UV radiation, for example. The disadvantage here is that there is now a third material present, i.e., not only the plastic material of the carrier structure and the material of the microcomponent integrated into it but also the adhesive material, which can then come into direct contact with the fluids to be tested. This can result in faulty measurements. Nor is it possible to exclude the possibility of toxic effects on the biological sample material. Another disadvantage is that such adhesive materials have a comparatively high viscosity and low wettability, which leads to the result that an adhesive of this type will not fill up an assembly gap by itself; that is, there will be no capillary action. Considerable effort is therefore required to transport the adhesive into such an assembly gap. The curing of adhesive materials filling assembly gaps by means of UV radiation, for example, is time-consuming, and the fabrication results are often unreliable. The low wettability requires wide gaps, and this in turn impairs the accuracy with which the microcomponents can be positioned in the carrier structure. The UV radiation used for curing can have disadvantageous effects on functionalized microcomponents, and in particular it can destroy antibodies immobilized on the functionalized surface of a microcomponent. The same is true for the use of heat to cure adhesives.

The invention is based on the goal of creating a new method of the type described above which makes it possible to connect components of a flow cell with increased precision and manufacturing reliability.

The method according to the invention which achieves this goal is characterized in that, a gap is formed between the components to be connected;
the gap is filled with a solvent;
material of at least one of the components bordering the gap dissolves in the solvent; and
after the solvent has evaporated, this material fills up the entire width and a portion of the height of the gap, thus connecting the components to each other.

It is advantageous that, because of its good wetting properties, a solvent of this type can quickly penetrate into very narrow assembly gaps by capillary action, which makes it possible to achieve high precision with respect to the mutual positioning of the components to be connected to each other.

To fill relatively large gaps, the solvent to be introduced into the gap can already contain dissolved material for connecting the components, i.e., material which is identical to the material of at least one of the components to be connected. It is advantageous for the volume of the filling material to be in the range of 0.1-5% of the volume of the solvent so as not to increase the viscosity too much.

In any case, the assembly gap is at least partially filled by the material which has solidified again after the evaporation of the solvent, and thus a permanent, liquid-tight connection is produced between the components. Because the material is the same as the material of one of the components, what is obtained in practice is that the filling material and the component form a single, integral part, especially in the case of amorphous plastic material.

The material can settle under the influence of gravity, in which case the gap must be closed off at the bottom. Alternatively or in addition, the settling of the material can be controlled by inertial forces, especially by means of centrifugal force.

The filling of the gap with settling material can be influenced by adjusting the temperature governing evaporation. In addition or alternatively, it would also be possible, when a centrifuge is being used, for example, to control the extent of the force governing the settling of the material.

Several filling and evaporation/settling cycles can be conducted to fill the gap completely over the course of successive procedures.

The previously mentioned material possibly forming at least one of the components is preferably an amorphous plastic such as PMMA, PC, PS, COC, or COP.

In an expedient embodiment of the flow cell produced according to the method, the component is arranged in a pocket of the carrier structure, and the gap is formed as an annular gap, which surrounds the component and is open at one of its axial ends.

In the pocket of the carrier structure, the component can rest on a ring-shaped shoulder, or it can rest on the bottom of the pocket closing off the other axial side of the gap.

In one embodiment, the ring-shaped shoulder is formed by a punched film connected to the carrier structure.

In a further elaboration of the invention, the ring-shaped shoulder or the bottom of the pocket comprises a structured surface, such that, between the carrier structure and the components resting on the ring-shaped shoulder or on the bottom of the pocket, an area is present which extends the gap. The component can be connected advantageously in this way to the carrier structure in a liquid-tight manner by means of settled material even in the area of the ring-shaped shoulder.

In another advantageous embodiment of the invention, the component comprises a functionalized surface on the side facing the ring-shaped shoulder. Because of the way the components are connected according to the invention, there is no impairment to this functionalization in the vicinity of the connection.

One of the components to be connected can also comprise one or more channel structures and/or reservoirs open at one end, which connect a place for introducing the solvent to the ring-shaped gap, or which can serve as an overflow space to receive solvent which exceeds the volume of the gap to be filled. As a result, the amount of solvent which is introduced can vary over a comparatively wide tolerance range.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
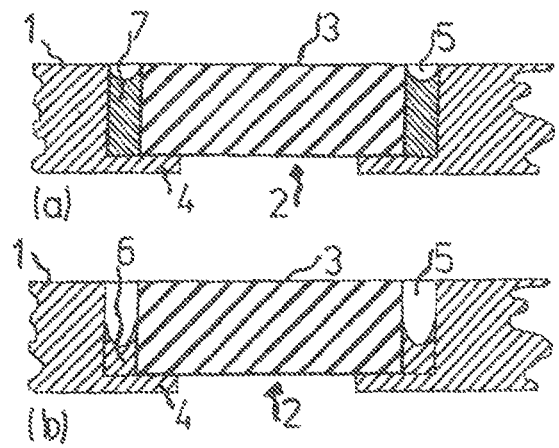
FIG. 1 shows a first exemplary embodiment of a flow call according to the invention produced by the connecting method according to the invention.

A microfluidic flow cell as shown partially in FIG. 1 comprises a plate-shaped carrier structure 1, which consists preferably of an amorphous plastic such as PMMA, PC, PS, COC, or COP.

A microcomponent 3—in the example shown, a component with the basic form of a circular disk or a square plate—is arranged in a pocket 2 of the carrier structure 1. The microcomponent is preferably made of silicon, but it can also be formed out of metal, ceramic, plastic, or glass with a surface which can be functionalized in various ways.

The microcomponent 3 rests on a ring-shaped shoulder 4 of the pocket 2; except for this shoulder, the pocket passes straight through the entire thickness of the carrier structure 1. An annular gap 5, formed between the carrier structure 1 and the microcomponent 3, is open on one axial side, whereas, on the other axial side, it is closed off by the ring-shaped shoulder 4 of the carrier structure 1. The width 3 of the annular gap 5 is typically in the range of 0.01-0.1 mm.

According to FIG. 1b, the annular gap 5 is partially filled with plastic material 6. The plastic material 6 bridging the width of the annular gap 5 is the same as the material of which the carrier structure 1 consists. During the evaporation of a solvent 7, introduced into the annular gap as shown in FIG. 1a, this material settles out, thus filling up the annular gap 5.

The solvent 7 dissolves some of the carrier structure 1, so that the plastic material 6 which has settled out of the evaporated solution consists at least partially of material removed from the carrier structure 1. Material of this kind can already be dissolved in the solvent 7, however, even before the solvent is introduced into the annular gap 5.

Different solvents can be used depending on the plastic out of which the carrier structure is made. For PMMA plastic, an acetone-based solvent is suitable, for example; for PC plastic, an ethyl acetate-based solvent can be used; and for COC plastic, a toluene-based solvent can be used. The contact angles between such solvents and the plastic material of the carrier structure are typically less than 10°, which means that it is possible to fill very thin gaps by capillary action.

The plastic material 6 which has become deposited in the annular gap 5 during the evaporation of the solvent 7 under the influence of gravity forms a fluid-tight bridge closing off the annular gap between the carrier structure 1 and the microcomponent 3; this bridge also produces a mechanically strong connection between these components. The amorphous plastic material settling out of the solution thus forms what in practice amounts to an integral part of the adjacent plastic of the carrier structure.

It is obvious that additional filling and settling cycles can be carried out to fill the annular gap 5 with the plastic material 6 to an even greater extent.

Figure 2:
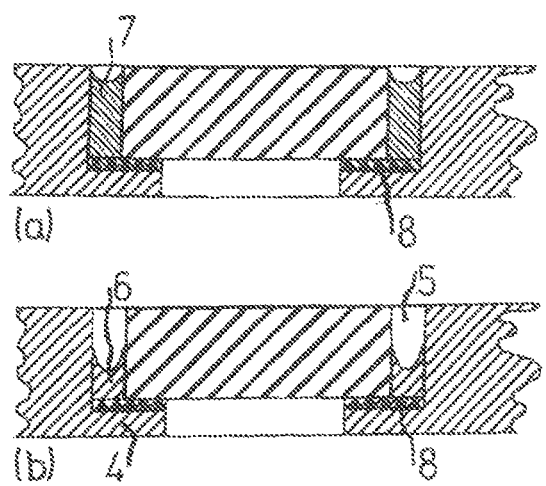
FIG. 2 shows a second exemplary embodiment of a flow cell according to the invention with an extended connecting area.

In the exemplary embodiment shown in FIG. 2, the ring-shaped shoulder 4 has a surface structure 8 of such a kind that a gap area forming a right-angled continuation of the annular gap 5 is formed; solvent 7 can also penetrate into this additional gap, which can thus be filled by resolidified plastic material 6. Capillary action stops abruptly at the inner edge of the ring-shaped shoulder 4, so that the capillary filling of the annular gap cannot proceed, and no solvent wets the bottom of the microcomponent outside the ring-shaped shoulder 4. A fluid-tight connection between the microcomponent 3 and the carrier structure 1 is thus also produced in the area of the ring-shaped shoulder 4. A surface structure 8 suitable for forming a gap continuation of this type can comprise a roughness of a defined type, grooves, webs, and/or local, possibly cylindrical, elevations, the end surfaces of which then form the support surface for the microcomponent.

Figure 3:
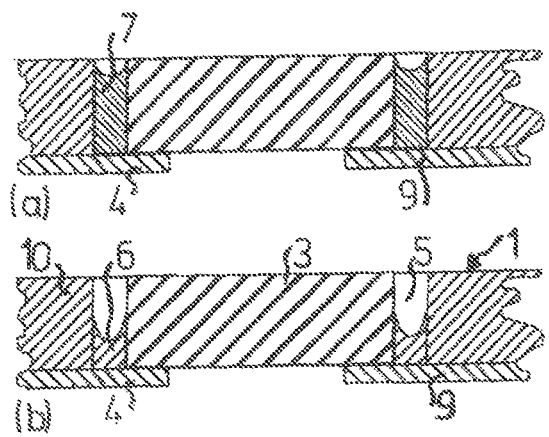
FIG. 3 shows a third exemplary embodiment of a flow cell according to the invention with a carrier structure formed out of a plastic plate and a film.

In the exemplary embodiment shown in FIG. 3, the ring-shaped shoulder 4 accommodating the microcomponent 3 is formed by a punched film 9. A plastic plate 10 and the film 9 together form the carrier structure 1, the film being bonded or welded to the plastic plate 10. The connection between the microcomponent 3 and the plastic plate 10 produced by the settled-out plastic material 6 also stabilizes the film 9, which is punched to form the ring-shaped shoulder 4. Because of the thinness of the film 9, there is the advantage that no dead volume is present in the area of the surface of the microcomponent 3 adjacent to the film 9; a dead volume which could, under certain conditions, have a negative effect on the testing of a fluid flowing past the microcomponent 3. The thickness of the film is preferably in the range of 0.01-0.2 mm.

The plastic plate of the carrier structure 1 can be made of one of the same materials as those cited above for the carrier structure 1.

Alternatively, the film 9 can be connected detachably to the microcomponent 3. Adhesive strips or tapes, for example, can be used to produce such a connection. After the annular gap 5 has been filled by the plastic material 6, these strips or tapes can be removed.

Figure 4:
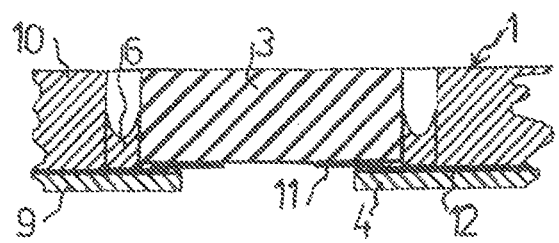
FIG. 4 shows a fourth exemplary embodiment of a flow cell according to the invention, which, in contrast to the exemplary embodiment of FIG. 3, also comprises electrical strip conductors.

An exemplary embodiment shown in FIG. 4 differs from the preceding example in that the microcomponent 3 is connected to strip conductors 11, which are in contact with strip conductors 12, which pass between the film 9 and the plastic plate 10. The width of the strip conductors can be in the range of 0.01-1 mm, and their thickness can be in the range of 0.01-10 μm. When the microcomponent 3 is integrated into the carrier structure 1 by the settling of the plastic material 6, the electrical contacts between the strip conductors 11 and 12 are also stabilized and fixed in place.

Figure 5:
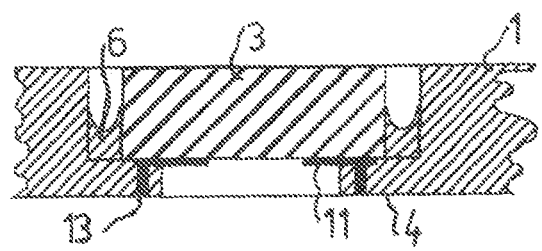
FIG. 5 shows a fifth exemplary embodiment of a flow cell according to the invention with strip conductors and conductor pins.

In the exemplary embodiment of FIG. 5, the ring-shaped shoulder 4 is again formed as an integral part of the rest of the carrier structure 1, and strip conductors 11 connected to the microcomponent 3 are electrically in contact with conductor pins 13, which are perpendicular to the strip conductors 11 and pass through the ring-shaped shoulder 4. The permanent connection between the microcomponent 3 and the carrier structure 1 produced by the settled plastic material 6 also stabilizes the electrical contact between the strip conductors 11 and the conductor pins 13.

Figure 6:
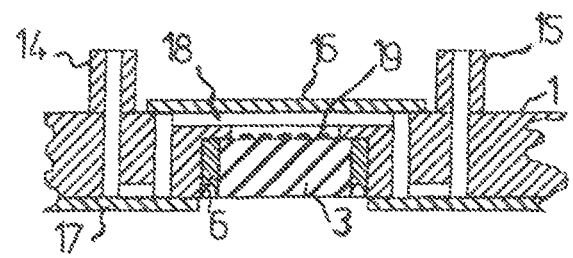
FIGS. 6-10 show additional exemplary embodiments of flow cells according to the invention.

According to FIG. 6, a fluid channel 18, which extends between the ports 14 and 15, is formed in the carrier structure 1, certain sections of this channel being bordered by films 16 and 17. The fluid channel 18 leads past a functionalized surface 19 of the microcomponent 3, which has been integrated into the carrier structure 1 by the settled plastic material 6.

Figure 7:
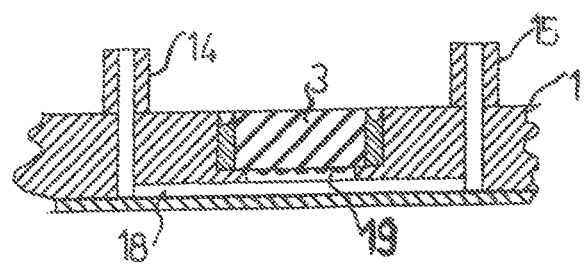

In contrast to FIG. 6, the functionalized surface 19 of the microcomponent 3 of FIG. 7 faces away from the side of the carrier structure 1 comprising the ports 14, 15.

Figure 8:
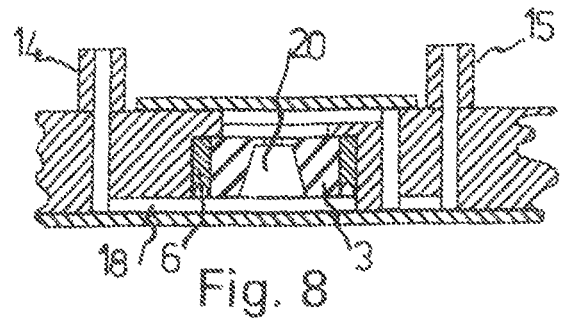
Figure 9:
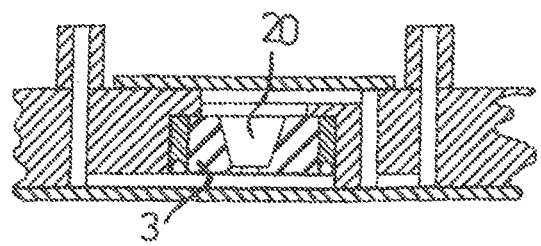

According to the exemplary embodiment of FIG. 8, a fluid channel 18 extends through a passage 20 in the microcomponent 3, as also in the case of the exemplary embodiment of FIG. 9, where the position of the microcomponent 3 is the reverse of that in FIG. 8.

Figure 10:
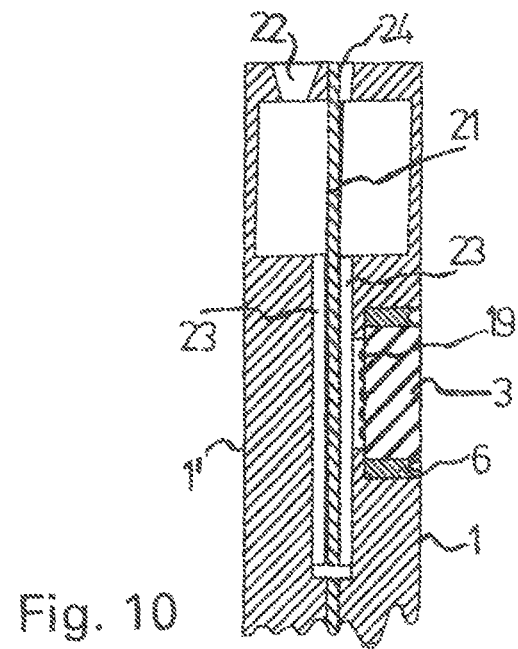

FIG. 10 pertains to a flow cell to be operated in the vertical position shown. It has a carrier structure 1 and another carrier structure 1', which is connected to the carrier structure 1 by a film 21 through the use of adhesive bonding or welding, for example. An inlet 22 on the carrier structure 1' is connected to a channel 23 possibly by way of several fluid-processing and preparation stations (not shown), which leads to a microcomponent 3 with a functionalized surface 19. Fluid introduced through the inlet 22 rises in the channel 23, wherein the air being displaced can escape through a vent opening 24.

As the liquid level rises beyond the microcomponent 3, the fluid pressure being exerted on the microcomponent 3 integrated into the carrier structure 1 by settled plastic material 6 increases, so that very strict requirements are imposed on the leak-tightness of the connections. As a result of the integration obtained according to the invention, these requirements can be satisfied.

While specific embodiments of the invention have been shown and described in detail to illustrate the inventive principles, it will be understood that the invention may be embodied otherwise without departing from such principles.

I claim:

1. A microfluidic flow cell, comprising:
   a carrier structure having a pocket having a bottom with an opening;
   a component arranged in the pocket at a distance from a wall of the pocket so as to form a gap between an entire outer surface of the component and the wall, the gap having a bottom formed by the bottom of the pocket and an opening opposite the bottom; and
   a connection structure obtained by dissolving material from at least one of the component and the carrier structure by a solvent in the gap and settling of the material from the solvent toward the bottom gap as a result of evaporation of the solvent through the opening, wherein the connection structure is formed by settled material that completely fills the gap from the bottom of the gap up to at least a portion of a height of the gap, wherein the connection structure has a layered configuration.

2. The flow cell according to claim 1, wherein the material is an amorphous plastic.

3. The flow cell according to claim 2, wherein the amorphous plastic is one of the group consisting of PMMA, PC, PS, COC, and COP.

4. The flow cell according to claim 1, wherein the gap is an annular gap that surrounds the component.

5. The flow cell according to claim 1, wherein the component rests in the pocket of the carrier structure on a ring-shaped shoulder or on the bottom of the pocket closing off the gap on one axial side.

6. The flow cell according to claim 1, wherein the ring-shaped structure is a punched film connected to the carrier structure.

7. The flow cell according to claim 5, wherein the ring-shaped shoulder or the bottom of the pocket comprises a surface structured so that an additional gap area connected to the gap is formed between the carrier structure and the component resting on the ring-shaped shoulder or on the bottom of the pocket.

8. The flow cell according to claim 5, wherein the component comprises a surface on a side facing the ring-shaped shoulder, the surface having functional groups attached thereon.

9. The flow cell according to claim 5, wherein the component comprises strip conductors on a side facing the ring-shaped shoulder.

10. The flow cell according to claim 9, wherein the strip conductors of the component are in contact with a strip conductor that extends to the component and is connected to the carrier structure.

* * * * *

UNITED STATES PATENT AND TRADEMARK OFFICE
CERTIFICATE OF CORRECTION

PATENT NO.       : 11,453,000 B2
APPLICATION NO.  : 16/421772
DATED            : September 27, 2022
INVENTOR(S)      : Lutz Weber Page 1 of 1

It is certified that error appears in the above-identified patent and that said Letters Patent is hereby corrected as shown below:

On the Title Page

Item (71) Applicant should read:
thinXXS Microtechnology GmbH,
Zweibrücken (DE)

Item (73) Assignee should read:
THINXXS MICROTECHNOLOGY
GMBH, Zweibrücken (DE)

Signed and Sealed this
Twenty-seventh Day of June, 2023

Katherine Kelly Vidal
*Director of the United States Patent and Trademark Office*